Jan. 7, 1969   K. PRESTL   3,420,114
FRICTION GEAR FOR INFINITELY-VARIABLE REGULATION
Filed Aug. 3, 1966

INVENTOR
KARL PRESTL
BY Haseltine and Nydick
ATTORNEYS

United States Patent Office 3,420,114
Patented Jan. 7, 1969

3,420,114
FRICTION GEAR FOR INFINITELY-VARIABLE REGULATION
Karl Prestl, Starenstrasse 23, Kelheim (Danube), Germany
Filed Aug. 3, 1966, Ser. No. 569,861
Claims priority, application Germany, Aug. 27, 1965,
P 37,552
U.S. Cl. 74—191
Int. Cl. F16h *15/16*
7 Claims

ABSTRACT OF THE DISCLOSURE

A variable-speed friction gear assembly in which the convex surface of a rotary input cone is in frictional rotation transmitting engagement with the periphery at the base of a rotary transmission cone thereby rotating the transmission cone by rotation of the input cone and in which the convex surface of the transmission cone is in frictional rotation transmitting engagement with the periphery of a wheel secured upon an output shaft thereby rotating the shaft by rotation of the transmission cone. The ratio of transmission between the input cone and the output shaft is variable by selectively changing the peripheral line of engagement at which the convex surface of the input cone is engaged by the base of the transmission cone and/or the peripheral line of engagement at which the convex surface of the transmission cone is engaged by the periphery of the wheel on the output shaft.

---

This invention relates to a friction gear for infinitely-variable speed regulation and comprising a driving cone, a transmission member adjustable along the driving cone by means of a spindle, and a driven member.

Among the friction gears constructed in this manner, a particularly acceptable kind has a friction wheel as the adjustable transmission member and, as the driven member, a driven cone oriented oppositely to the driving cone. However, a serious drawback of such gears is that they may not permit exploitation of the entire length of the cone as the regulating range. The greater the speed of the driven member, and/or the torque to be transmitted, the smaller the usable cone length. The reason for this is as follows:

When producing a high speed in the driven member, the friction wheel is located in the region of the highest peripheral velocity of the driving cone, i.e. in the region of the greatest diameter of the latter, while acting on the driven cone in the region of its smallest diameter. Since the transmissible torque is composed of the force acting on the periphery about the radius arm, in this case the small radius of the driven cone, and since the force transmitted from the friction wheel to the driven cone is limited by the coefficient of friction of the contacting materials, only a certain, and by reason of the small diameter only a relatively small moment can be transmitted. Thus at higher torques the friction wheel slips in relation to the driven cone.

An object of the invention is to eliminate or at least minimise these drawbacks and to provide a friction gear which permits not only an infinitely variable speed regulation over a wide control range, but simultaneously also the transmission of larger turning moments at high-gear or low-gear ratios.

According to the present invention there is provided a friction gear for infinitely-variable speed regulation, comprising a rotary driving cone, a rotary transmission member adjustable along the length of the driving cone, and a rotary take-off member, characterised in that the transmission member is in the form of a cone whose base region is in frictional driving contact with the driving cone and whose conical surface is in frictional driving contact with the take-off member. Thus, torque is transferred by the driving cone onto a constant, large diameter, namely the base diameter of the transmission cone, so that the apex region of the latter shall also have this torque. Thus, moment can then be transmitted without difficulty from the apex region of the cone to the driven member, since the diameter of the latter can be selected arbitrarily according to the desired speed range and is preferably equal to or greater than the smallest working diameter of transmission cone.

Moreover, the friction gear according to the invention has the great advantage that its dimensions and thereby the dimensions of the gear housing can be varied almost at will, since for a given direction of the driving shaft axle, the axes of the transmission cone and the take-off member can occupy various positions in relation thereto. Thus, the gear can be adapted to the practical requirements for any particular case, both as regards its size and shape and also with respect to the position of the driven shaft in relation to the driving shaft.

According to another feature of the invention, the driving or the driven shaft is adjustable transversely in relation to the transmission cone axis, and the latter is arranged to pivot about a spindle serving for its adjustment. This transverse adjustability allows disengagement of the gearing, and also a variation in the contact pressure between the driving cone or the driven member and the transmission cone and thereby a variation in the friction for transmitting torque. The contact pressure may be uniformly distributed over the two contact surfaces of the transmission cone, owing to the pivotable mounting of said cone.

In one embodiment of the invention the transmission cone is carried in a bearing bracket, said bearing bracket being pivotally mounted on the spindle.

The invention further provides for arranging the driven shaft parallel to the adjacent surface of the transmission cone and for constructing the driven member as a wheel with an arcuate contact surface. This achieves, on one hand, a particularly advantageous constructional form of gear, and on the other hand satisfactory transmission is ensured by the arcuate contact surface, especially since at low contact pressures a virtually point contact exists between the transmission cone and the driven wheel and thus no unwanted change in velocity occurs along the contact surface of the driven wheel.

According to another feature of the invention, the driven shaft is arranged at an angle to the axis of the transmission cone, this angle corresponding to the cone angle, and the driven member has a conical contact surface whose cone angle corresponds to that of the transmission cone. This measure increases the friction surface, without leading to relative velocities along the contact surface of the driven member, since the smaller diameter of the transmission cone always co-operates with the smaller diameter of the conical contact surface. This is also valid for the greater diameters. Furthermore, the transmission cone can be so arranged that the power take-off shaft is parallel to the drive shaft, this requirement being frequently imposed on gears.

According to a further feature of the invention, a disc is provided at the base of the transmission cone, the contact surface of which disc is either arcuate or conical according to the cone angle of the driving cone. The disc may have a groove in which a ring made of an elastic material having a high co-efficient of friction is seated. By this means, the advantages already described in connection with the take-off member are also provided for the transmission cone.

It is further within the scope of the invention to arrange the aforementioned spindle parallel to the adjacent surface of the driving cone.

Embodiments of the invention will now be described, by way of example, with reference to the accompanying drawings, in which.

Figure 1:
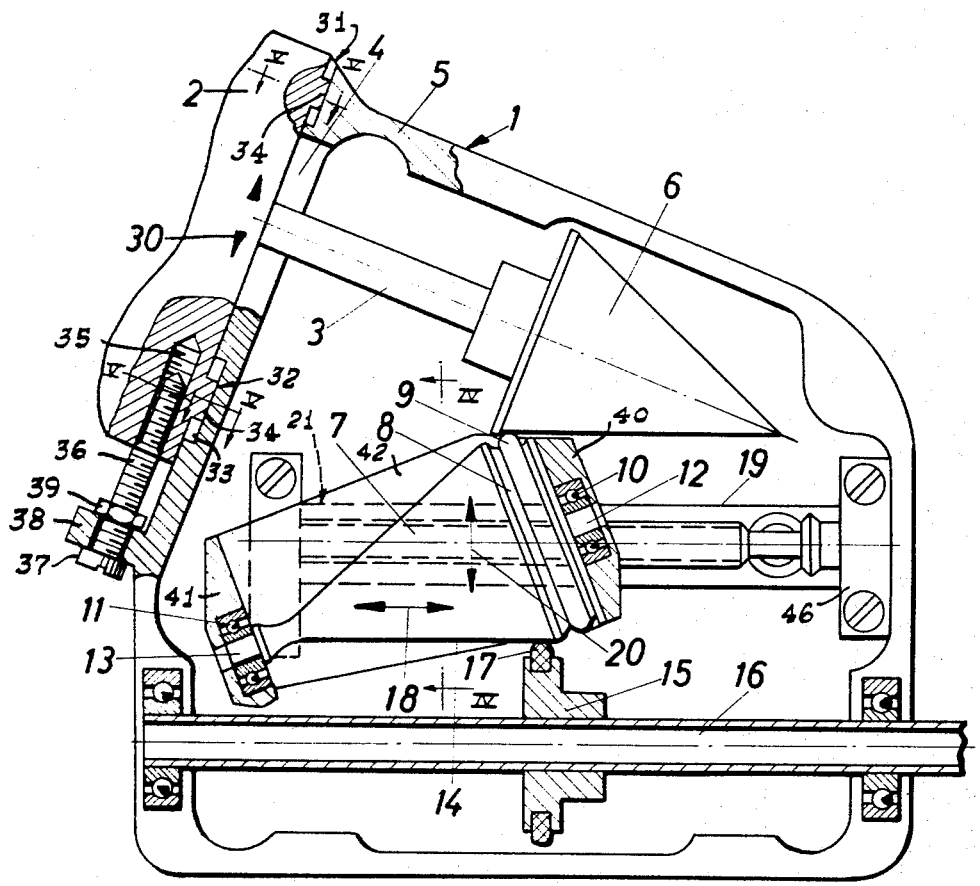
FIG. 1 is a partly sectional plan view of one form of friction gear.

Referring to FIG. 1 of the drawings, the friction gear, designated as a whole by the reference 1, is driven by a motor 2 whose shaft 3 passes through a bore 4 into a housing 5 of the gear 1.

On the shaft 3 is mounted a driving or input cone 6 which rotates at constant speed and transmits a peripheral velocity corresponding to the cone radius, to the base of a transmission cone 7.

A disc having a groove 8 is formed on the base of the transmission cone 7 and a ring 9, made of an elastic material with a high co-efficient of friction, is seated in the groove. The ring 9 bears against the driving cone 6 and is driven by the torque transmitted by the latter. The cone 7 is rotatable in two bearings 10 and 11 by means of integral journals 12 and 13, and transmits the torque along its axial surface 14 to a driven wheel 15. The wheel 15 is secured upon an output shaft 16 which traverses the housing 5 of the friction gear 1 substantially opposite to the motor 2 in an angular position in relation to the motor shaft 3.

Both the ring 9 seated in the groove 8 and a friction ring 17 of the take-off wheel 15 have an arcuate contact surface, so that an approximately line contact exists between the individual parts.

FIG. 1 shows the gear in a position in which a double increase to higher speeds takes place; the transmission cone 7 is driven by contact with the greatest diameter of the driving cone 6, i.e. with the highest peripheral velocity, and cone 7, in turn, transmits the torque along its largest circumference to the take-off wheel 15.

In order to make a speed reduction also possible the transmission cone 7 is adjustable in relation to the driving cone 6 and the take-off wheel 15, in the direction of a double headed arrow 18. In the embodiment shown here, adjustment is effected by means of spindle 19 which can be operated manually or from a remote position. The adjusting range of the cone 7 is limited by devices such as stops arranged on, for example, the spindle 19.

In order to allow disengagement of the gear or to produce more or less pressure between the frictionally engaging parts, the bore 4 of the housing 5 has a diameter greater than that of the motor shaft 3, so that the motor 2 is displaceable in relation to the gear housing 5 in the direction of a double headed arrow 30.

Figure 5:
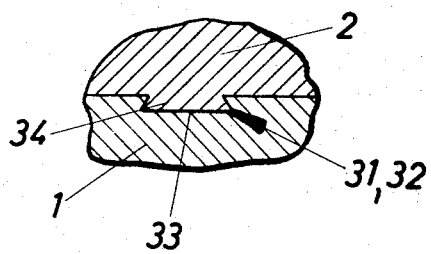
FIG. 5 is a section taken on line V—V of FIG. 1.

FIGS. 1 and 5 show in detail a simple and conventional structure for displacing motor 2 and with it input cone 6 parallel to its axis in either direction of arrow 30 and thus with reference to transmission cone 7. According to the figures, the base of motor 2 is slidably guided on the housing of gear assembly 1 by dovetailed keys 31 and 32 each formed by an undercut groove 33 engaged by a correspondingly shaped extension 34 on the base of the motor. A threaded bore 35 in the motor casing receives a screw bolt 36 threaded through a bore 37 of a lug 38 protruding from the housing of gear assembly 1. As is evident, by screwing bolt 36 more or less deeply into bore 35, the motor and with it cone 6 can be displaced in the directions indicated by arrow 30. The bolt may be secured in a selected position by means of a lock nut 39.

Figure 2:
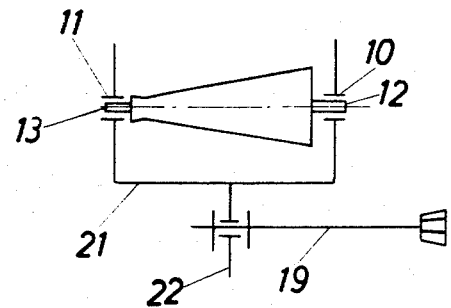
FIG. 2 is a diagrammatic view of the mounting of the transmission cone.

Moreover, the transmission cone 7 is pivotable in the direction of a double headed arrow 20. FIG. 2 schematically illustrates the adjustment and the pivotal mounting of the transmission cone 7. The cone bearings 10 and 11 are carried by a bearing bracket 21 which is pivotally mounted, as a bearing 22, on the adjusting spindle 19.

Figure 4:
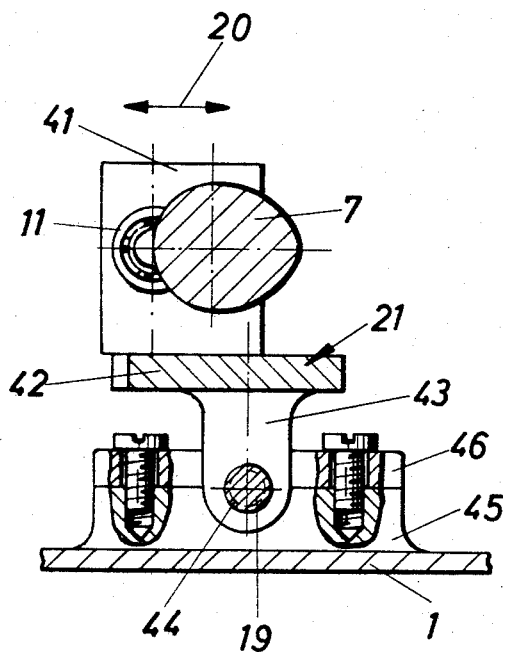
FIG. 4 is a section taken on line IV—IV of FIG. 1.

The pivotal mounting of transmission cone 7 is shown in greater detail in FIG. 4. According to this figure the bearings 10 and 11 for the cone are mounted on two lugs 40 and 41 vertically extending from a base plate 42 of bracket 21. A leg 43 depending from the base plate includes a threaded bore 44 through which spindle 19 is threaded.

As is now evident, turning of spindle 19, either manually or by remote control as previously explained, causes linear displacement of bracket 21 and with it of transmission cone 7 in either direction of arrow 18. In addition, the frame structure and with it cone 7 can be pivoted about spindle 19 (see also FIG. 2) for displacing cone 7 in either direction of arrow 20.

FIG. 4 further shows in detail the mounting of the spindle. As is illustrated, a boss 45 on the housing of gear assembly 1 and a cover plate 46 define in conjunction the threaded bore 44. The cover is suitably secured on the boss, for instance by screws.

Figure 3:
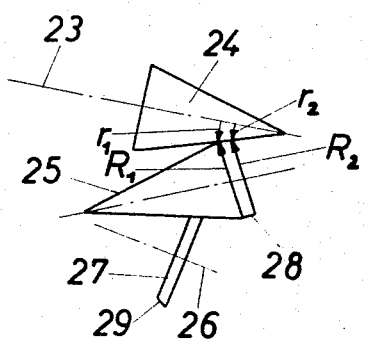
FIG. 3 is a diagrammatic view of a second form of friction gear.

FIG. 3 shows a modified arrangement of the rotary axes. Motor shaft 23 carries a driving cone 24 which transmits torque to a transmission cone 25 which in turn transmits torque to a take-off wheel 27 on a take-off shaft 26. Both the base of the transmission cone 25 and the take-off wheel 27 have conical contact surfaces 28 and 29 respectively, which have angles of inclination corresponding to the cones in question. In this manner, the driving cone 27 always acts with its larger radius $r_1$ on the larger radius $R_1$ of the transmission cone 25 and with its smaller radius $r_2$ on the smaller radius $R_2$ of the cone 25, so that relative velocities cannot occur along the contact surface 28.

By corresponding arrangement of the axis of the transmission cone 25, the driving shaft 23 and the take-off shaft 26 can be made parallel.

As practical experience has shown, with a gear constructed as hereinbefore described transmission ratios of up to 1:100 can be achieved and such high transmission ratios were not obtainable heretofore. Moreover, a correct transmission of large turning moments can also be ensured.

The invention is not of course limited to the embodiment here shown and modifications are possible without departing from the scope of the invention. Thus, for example, the arrangement of the various axes can be adapted to the requirements prevailing in a given case. The pivotal mounting of the transmission cone 7 can also be modified in various ways. The materials of the individuals parts can be chosen in the light of the torque to be transmitted. Thus, the cones 6 and 7 and the take-off wheel 15 may be formed of an elastic material, for example toughened rubber.

I claim:

1. A variable-speed gear assembly comprising in combination:

a rotatable input cone drivable about its lengthwise axis;

a transmission cone rotatable about its lengthwise axis, the periphery at the base of the transmission cone being in rotation transmitting frictional engagement with the convex surface of the input cone for rotating the transmission cone by driving the input cone;

an output shaft having secured thereupon a friction wheel, the periphery of said wheel being in rotation transmitting frictional engagement with the convex surface of the transmission cone; and speed varying means for varying the ratio of transmission between said input cone and said output shaft, said speed varying means including a support bar mounted parallel to said output shaft and supporting said transmission cone lengthwise displaceable thereon for varying, by displacement of the transmission cone on the bar, the peripheral line along which the convex surface of the input cone is engaged with the base of the transmission cone and the peripheral line along which the convex surface of the transmission cone is engaged with the friction wheel thereby correspondingly varying the ratio of transmission of the gear assembly.

2. The gear assembly according to claim 1 and comprising a bracket rotatably supporting said transmission cone and supported by said bar lengthwise displaceable thereon and also pivotable about the bar.

3. The gear assembly according to claim 1 and comprising a shaft mounting said input cone, and adjustable mounting means supporting said shaft transversely displaceable in reference to the rotational axis of the transmission cone.

4. The gear assembly according to claim 1 and comprising a ring at the base of the transmission cone encompassing the same and having a cross sectionally curved peripheral running surface engaged with the convex surface of the input cone.

5. The gear assembly according to claim 1 wherein the transmission cone has an apex angle such that its convex surface is positioned parallel to the axis of the output shaft at the point of engagement between the convex surface of the transmission cone and said friction wheel on said peripheral line.

6. The gear assembly according to claim 5 wherein said friction wheel has a cross sectionally curved peripheral running surface.

7. The gear assembly according to claim 1 wherein the rotational axis of the output shaft and the rotational axis of the transmission cone define an acute angle therebetween, and wherein said friction wheel has a peripheral running surface slanted to match the slant of the convex surface of the transmission cone.

References Cited

UNITED STATES PATENTS

| | | | |
|---|---|---|---|
| 1,011,629 | 12/1911 | Lacombe | 74—191 |
| 2,424,873 | 7/1947 | Abbrecht | 74—191 |
| 2,526,435 | 10/1950 | Teigman | 74—191 |
| 2,715,164 | 9/1955 | Hufnagel | 74—191 |
| 3,048,046 | 8/1962 | Cosby | 74—191 |

C. J. HUSAR, *Primary Examiner.*